Sept. 16, 1969 T. W. McSHERRY 3,467,114
TRANSFORMABLE STRUCTURES
Filed April 6, 1966 8 Sheets-Sheet 1

INVENTOR.
THOMAS W. McSHERRY
BY Joseph D. Lazar
ATTORNEY.

INVENTOR.
THOMAS W. McSHERRY
BY Joseph D. Lazar
ATTORNEY.

Sept. 16, 1969 T. W. McSHERRY 3,467,114
TRANSFORMABLE STRUCTURES
Filed April 6, 1966 8 Sheets-Sheet 3

INVENTOR.
THOMAS W. McSHERRY
BY Joseph D Lazar
ATTORNEY.

Sept. 16, 1969     T. W. McSHERRY     3,467,114
TRANSFORMABLE STRUCTURES

Filed April 6, 1966     8 Sheets-Sheet 6

INVENTOR.
THOMAS W. McSHERRY
BY Joseph D. Lazar
ATTORNEY.

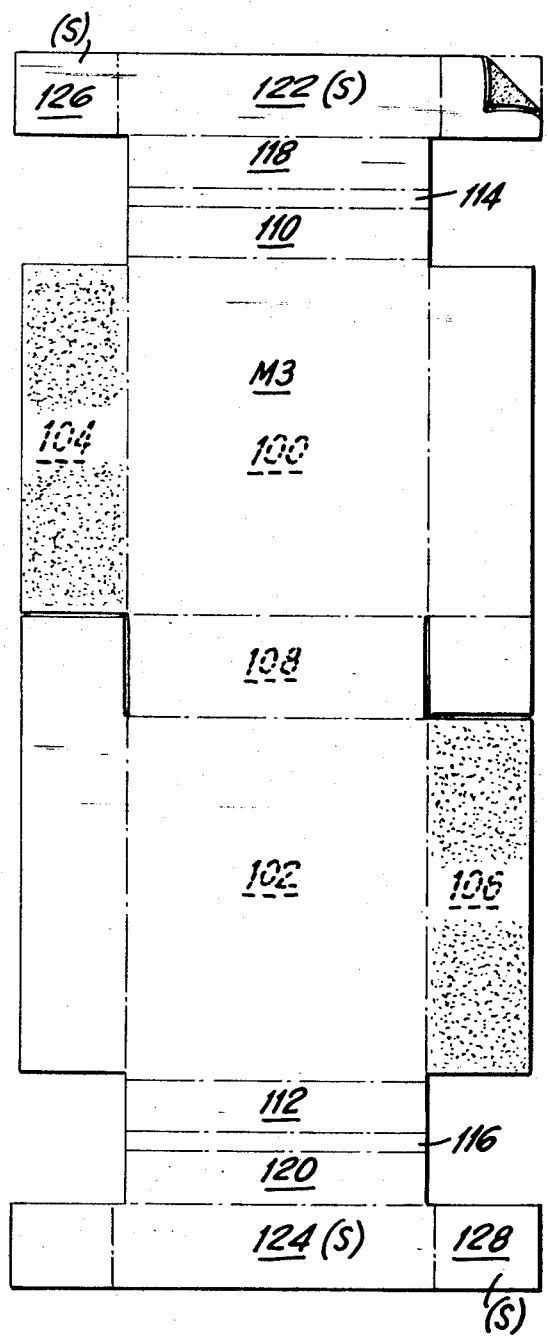
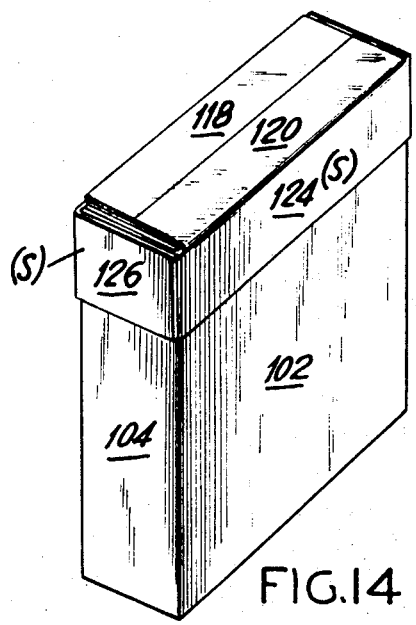
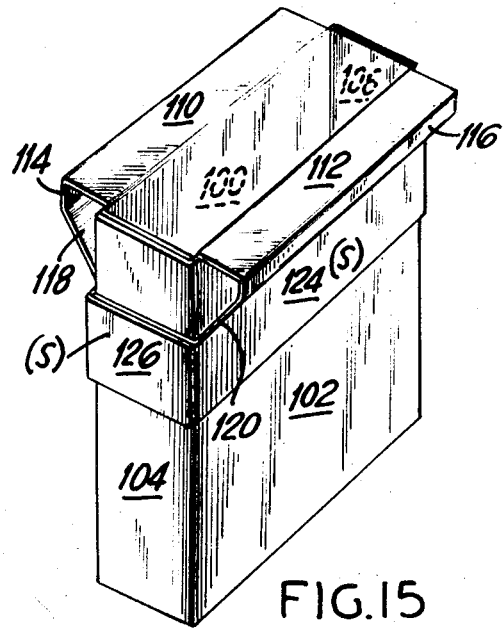
FIG. 13
FIG. 14
FIG. 15

United States Patent Office
3,467,114
Patented Sept. 16, 1969

3,467,114
TRANSFORMABLE STRUCTURES
Thomas W. McSherry, North Babylon, N.Y., assignor of twelve and one-half percent each to Jakob S. Pedersen, and Peder M. Pedersen, both of North Babylon, N.Y., and twenty-five percent to Joseph D. Lazar, North Babylon, N.Y.
Filed Apr. 6, 1966, Ser. No. 545,232
Int. Cl. A45f 1/16; E04b 1/347; B65d 5/66
U.S. Cl. 135—2                                     8 Claims

ABSTRACT OF THE DISCLOSURE

A transformable structure of a flexible member connected to a rigid member. A linking member such as a collar slides over the flexible member and is attached to the rigid member. Relative movement of the collar to the flexible member effects a side-by-side generally parallel form to an expanded form wherein the flexible and rigid members are diverted.

---

This invention relates to transformable structures and more particularly to structures that are transformed from a compact or closed to expanded or open form. The structure is adaptable for a variety of different applications such as shelters, containers, furniture and manipulative implements.

Early in the history of mechanics there evolved a class of devices which can be termed foldable or collapsible structures. Such structures are made of two or more elements connected such that the spatial relation of the members are changed or transformed by the relative movements of at least one of the members. Such members are connected by articulated joints which are pivoted, or hinged, together with connecting members which are rigid or flexible. Examples of such structures are collapsible chairs, tents and umbrellas.

The structures heretofore known of which the above-referred are but a suggested listing, are each classified within general groups of mechanisms, each of which are usually clearly distinctive. Each device or structure desired requires a designer's creative efforts without any guidance from a previous design except within the skill and expertise of the designer. It appears that there is no structure which can be universally or at least broadly used for the purpose of facility of design.

The principle of my invention is based on the reversible transformation of two structure members oriented in one form from a generally parallel or side-by-side relation to another form, wherein said members are non-parallel or diverted whereby the structure is expanded from the original form. This transformation is effected by linking the members in cooperation with the joints of the members spaced from the portions linked, to distort or transform one of the members from a generally linear to non-linear (articulated) or curved form. Such a distortion is produced by one member determining the limit of movement of the other which in turn reacts to the limited movement by becoming distorted. The distortion causes a bending or flexing of a member which is rendered flexible and causes articulation of members which are rigid but articulatedly joined.

This principle is carried out, for example, in a master member which I term a "director," joined to a distortable member which I term a "reactor." The director is generally of fixed length and substantially rigid. The reactor is generally of greater length than the director and is flexible and thus distortable. A linking member, such as a collar, is attached to one end of the director and encircles the reactor. The other end of the director and one end of the reactor are joined as by a hinge or other equivalent resilient connection, lumped or distributed, to allow diversion or expansion of the members from contracted side-by-side or parallel orientation. Movement of the collar in a direction away from the joint of the two members, forces the flexible or articulatable reactor member to deform and thereby expand relative to the other member.

In one form, the structure of the invention may be utilized for furniture such as a collapsible chair or table. The portion of such device for horizontal support being embodied in one or two director members and the support of the structure from the floor being embodied in a one or more cooperatively flexible member. A collar embraces the flexible member and is pivotally attached to the horizontal member, the two members being flexibly joined at their respective ends. In expanded form the structure is available for use as a chair or table. For storage, the device is contracted or collapsed by simply transforming the flexible members from distorted flexed position to side-by-side relation with the director member, the relative movement and deformation of the members being guided by the collar.

In general, a hinged connection between the director and reactor and between the director and the linking member or collar is required for the invention only when all of the members whether in planar or rod form are rigid, i.e. non-flexible. For uses of the invention wherein the members are all flexible, or rigid and flexible, the type of connection or attachment of the respective members to the other or to the collar or linking member will depend in general on the material of the members and the dimensions as will become better understood from a study of the various embodiments to be described. It will be understood, therefore, that the form of attachment of each member, whether by pivotal hinge, or fixed connection, will depend on the embodiment and its environment.

The application of the invention for use as a generic tool of the many presently envisioned embodiments, is effected by selection of the shape, length and material of the members and the method of connecting them. The invention is thus applicable to a wide variety of seemingly unrelated objects, structures and devices. For example, a plurality of linking members in rigid rod form each spectively connected to a same plurality of flexible rods are commonly connected at their other ends to a collar encircling all of the flexible rods and slidable thereover. A flexible or elastomeric material of plastic, rubber or cloth is attached to the flexible members, serving thus as a skin or protective cover as the members are transformed from contracted to expanded form for use as a tent or the like.

Several other forms of the invention as well as those described above shall now be described in greater detail in relation to the illustrative drawing attached hereto wherein:

FIG. 1 is a front elevation in expanded form of a chair illustrating one use of the invention;
FIG. 2 is a side elevation of the chair shown in FIG. 1;
FIG. 3 is a side elevation of the chair of FIGS. 1 and 2 in collapsed form;
FIGS. 4 and 5 are respectively the front and side elevation of a different form of the invention useful as a crossbow or manipulative implement;
FIG. 6 is a perspective view of a container form of the invention;
FIG. 7 is a perspective of a lamp embodiment;
FIG. 8 is a side elevation of another form of the invention showing a tent in contracted form;
FIG. 9 is a side elevation of the tent in open or expanded form shown in FIG. 8;
FIG. 10 is a top plan view of the tent shown in FIG. 9;

FIG. 11 is a perspective view in side elevation of a box in closed form utilizing the principle of the invention;

FGI. 12 is a perspective view of the box shown in FIG. 11 but in open or expanded form;

FIG. 13 is a form used to fabricate a carton utilizing the principle of the invention;

FIG. 15 is a perspective view of the carton closed formed from the blank of FIG. 13, and FIG. 15 is a perspective view of the carton of FIG. 14 but in open form.

Figure 1:
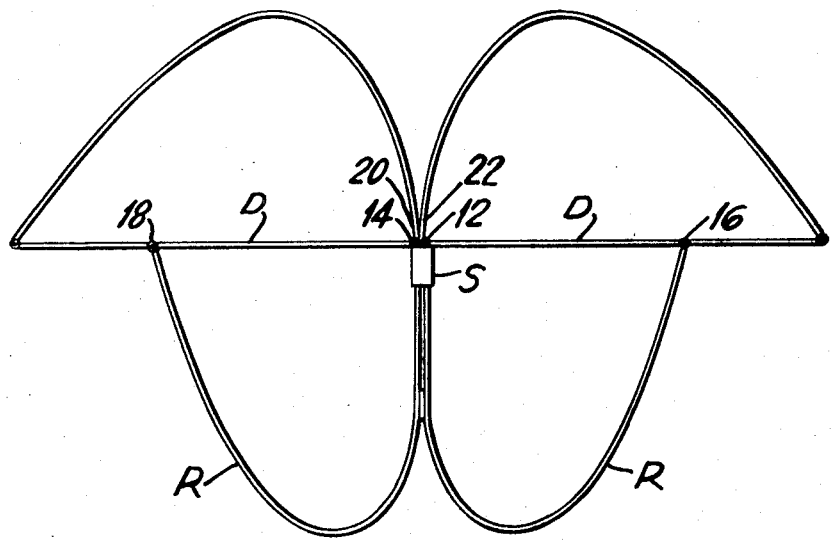
Figure 2:
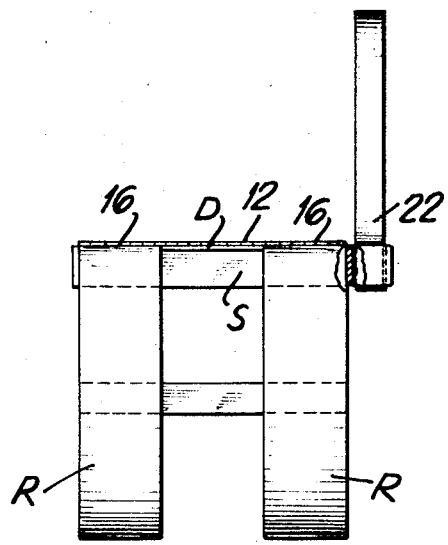

Referring now to FIGS. 1 and 2, there is shown in schematic diagrammatic form an application well suited to illustrate the principle of the invention.

The structure of the invention comprises for all the embodiments to be described herein a director element D, a reactor element R and a slider element S. The director and reactor may be in elongated form, such as a rod, or in planar form, such as a sheet, the material of which being of various degrees of flexibility. The form and structural composition of the members will depend upon the application to be made of the structure, as should become clear from an understanding of the several embodiments to be described.

The slider S serves as a coupling or linking element to provide a slidable connection of the system, comprising the two elements, for the transformable modes. In general the slider is a sliding member in the form of a closed or open collar, the shape and dimensions of which depend on the embodiment.

FIGS. 1 and 2 illustrate the use of the three components to form an article of furniture, such as a chair or table. In FIGS. 1 and 2 the device is shown in the expanded form ready for use comprising a pair of end-to-end structures each comprising a director D, reactor R and slider S. The director member D is planar and substantially rigid with little flexibility, serving as the horizontal support member for the user of the chair, or for the plane surface for use as a table.

The member R is of flexible planar form made of plastic or steel. The slider S is pivotally connected to an edge of director D as at hinges 12 and 14. The opposite edges of the director are pivotally connected as by hinges 16 and 18 to the end of flexible members R. Slider S is a rectangular collar of substantial depth for receiving the members R, side-by-side, in sliding engagement therein.

Figure 3:
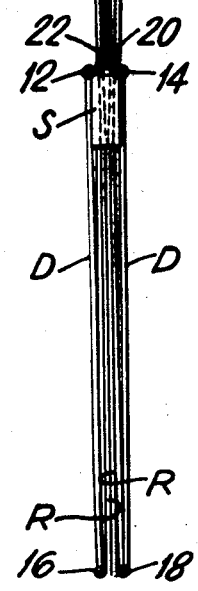

FIG. 3 illustrates the chair in collapsed or contracted form wherein the several elements are indicated corresponding identically to the corresponding parts of the expanded form shown in FIGS. 1 and 2. It will be readily appreciated that the respective ends of members R (20, 22) on being drawn upwardly, as seen in FIG. 1, cause the members R to slide upwardly within the slider S, and the members D to be pivoted downwardly until the members R are withdrawn upwardly through the slider S a distance where the members R are substantially straight and parallel with the guide members (directors) D. The members D being substantially rigid, establish a limit of withdrawal of the members R upwardly. At this limit, the structure is in fully contracted form.

Figure 5:
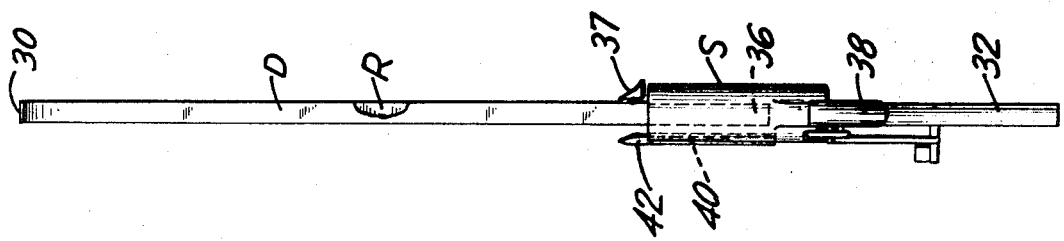
Figure 4:
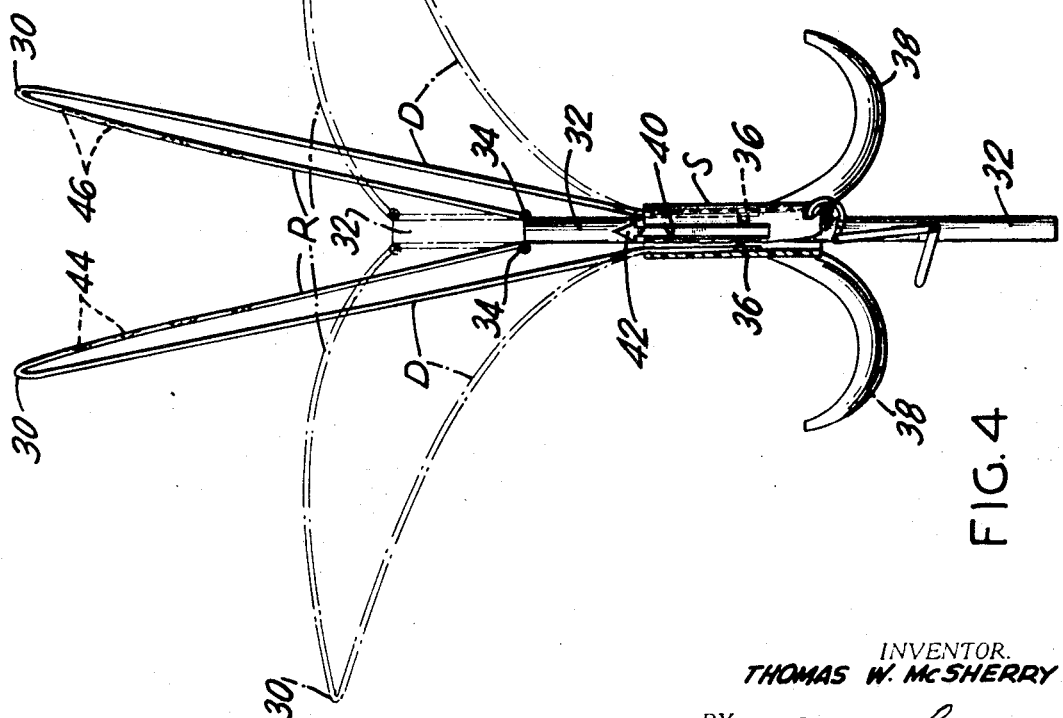

Referring now to FIGS. 4 and 5, there is shown in perspective form a device formed from a pair of structures of the invention which may be useful as presently envisioned as a cross-bow, or as an instrument for surgical application.

As seen in the drawing the structure comprises a slider S, a director D and a reactor R. The members D and R are strips of spring steel suitably joined or bent at 30. The opposite end of the member R is attached to a rod 32 at 34. The opposite end of the director D is secured within the slider S as at connection 36. The slider S is provided with a pair of finger guides 38. The slide S is also provided with a recess groove 40 for receiving an arrow 42.

As shown in FIGS. 4 and 5 the device for use as a cross-bow is shown in contracted form wherein the director D and reactor R are substantially parallel with each other. For use as a cross-bow the device is expanded by gripping the guides 38 and exerting a force downwardly causing the slider S to slide downwardly on the rod 32 whereby the members D and R assume the position shown in dotted lines. It will be appreciated since the members D and R are of spring steel, stored energy is effected by the system when in the position shown by the dotted lines. When released by a trigger or the like, not shown, the spring force of the members D and R causes the slider to be hurled upwardly, until, as shown in the drawing, the members assume the position shown in solid line. A stop 37 fixed to the rod 32 may be used to assure a precise limit of forward movement of the slide S. Impact against stop 37 causes the arrow to be hurled from the slider S.

The members D and R can be changed for other purposes to various shapes, such as a knife edge on the portion R facing inwardly to service as a surgical knife. Also member R can be provided with recess portion, such as shown at 44, 46, serving as receptacles or grippers of variously shaped articles. For use as such an instrument the slider S is drawn or urged upwardly causing the attitude shown in dash-dot lines whereby the member pairs D and R act as fingers. Furthermore, it will be appreciated that only one director and reactor need be used to provide a useful scissor in combination with a fixed-edge extension of the rod.

Figure 6:
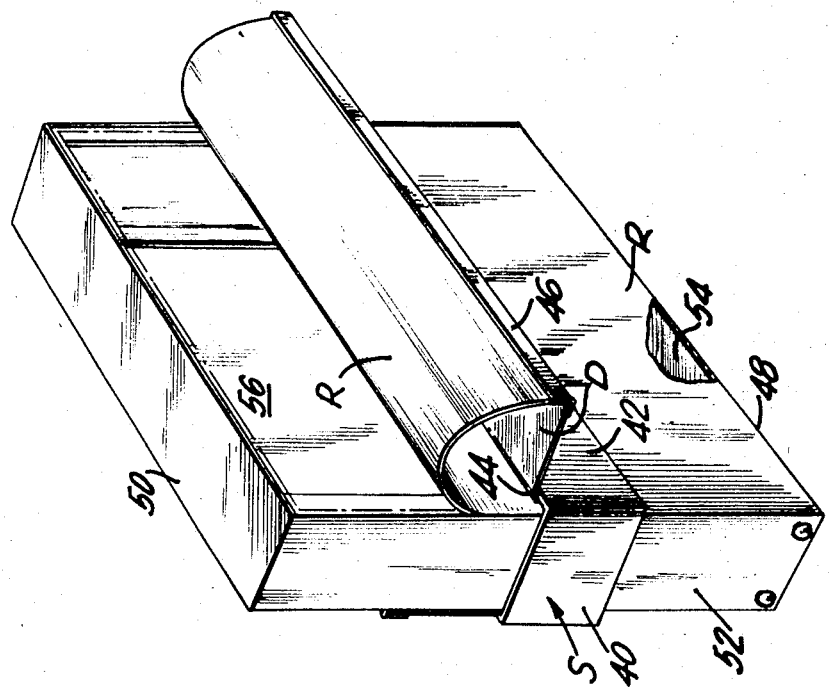

Referring now to FIG. 6, there is shown in perspective view another application of the invention as a container, both uniquely ornamental and useful. The slider S is a rectangular collar having a side wall 40 and a front wall 42 of rigid material. The director member D is of sheet form substantially inflexible pivotally connected along hinge 44 to the upper edge of the front wall 42 of slide S. The upper edge 46 opposite therefrom is flexibly connected to the upper edge of member R at the edge corresponding with the hinge 44. Member R is planar and of flexible material and is rigidly attached at the bottom portion as indicated at 48. The container is enclosed with a top wall 50, side walls 52 and a bottom wall 54. The rear wall 56 may be permanent and fixed to the rear edges of walls 56, 54 and 50, or may be, if desired, of the same implementation of the front wall as described.

In operation, the slider S upon being drawn downwardly, shown in FIG. 6, forces the director member D to draw the member R away from the closed position outwardly and downwardly. In the fully open position the member R assumes a semi-cylindrical form. The inner wall of member R may be provided with pockets, recesses and attachments for holding jewelry and other articles to suit the user. Furthermore, the container may serve as an attaché case or file cabinet provided with inner pockets rendered suitably operative by the movement of the slider or wall member to open or close the various pockets according to any predetermined schedule, such as alphabetical index or the like.

Figure 7:
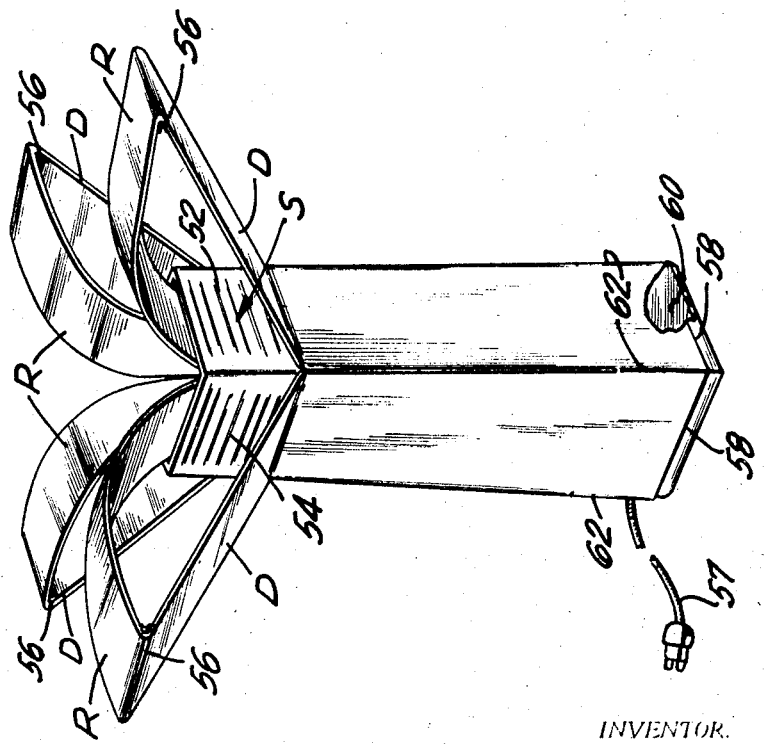

Referring now to FIG. 7, there is shown in perspective a further application of four of the basic structures of the invention embodying a lamp unique in functional design. The slider S is of general square collar form having four walls, two of which are shown as at 52 and 54. On the bottom edge of the slider S are pivotally connected four director members D of substantially inflexible material in planar form. The opposite edges of the member D are attached to the elongated rectangular reactors R as at the hinge portions 56.

The members R form a rectangular tube constrained to that shape by slider 52. The members extend downwardly and mutually perpendicular to the other and are connected at the bottom of the lamp as at connections 58. The bottom wall 60 serves as the rigid stabilizing base connection of the assembly. The four members M may be conveniently joined together along the seam portions 62, the length of which corresponds with the height of the slider S.

Electrical control means, not shown, are provided to effect a variable light intensity effect of the lamp. A potentiometer is coupled to the slider and calibrated to represent each of the positions of the slider as it is moved from its down to up position corresponding to a desired maximum intensity and minimum intensity of light or, if desired, an off position of the lamp respectively. The output of the potentiometer is connected to the surface portions of the reactor elements on which electroluminescent chemicals are coated whereby the variable output signals of the potentiometer will effect a variable excitation of the light producing chemicals. Colors of various types may also be used as desired. Electrical power supply leads 57 are connected to the potentiometer in the usual manner.

In operation the slider S is moved upwardly, the directors D being of fixed length, pivot about the respective hinged connections at the bottom of the slider S closing toward the slider and closing the members R in a withdrawing action such as the closing of petals of a flower. In such attitude the assembly is in fully closed or contracted form. To expand or open the assembly, the slider S is drawn downwardly thereby causing the directors to pivot outwardly away from the assembly drawing members R away and upward from the central vertical axis, in a flower-like opening action. The inner surface of the members R may be provided as above indicated with luminous material energized by light or electricity, as well known by those skilled in this art, and with any of a plurality of available colors to effect generation of light and color. The lighting intensity is controlled by electrical signals according to the position of the slider.

Figure 8:
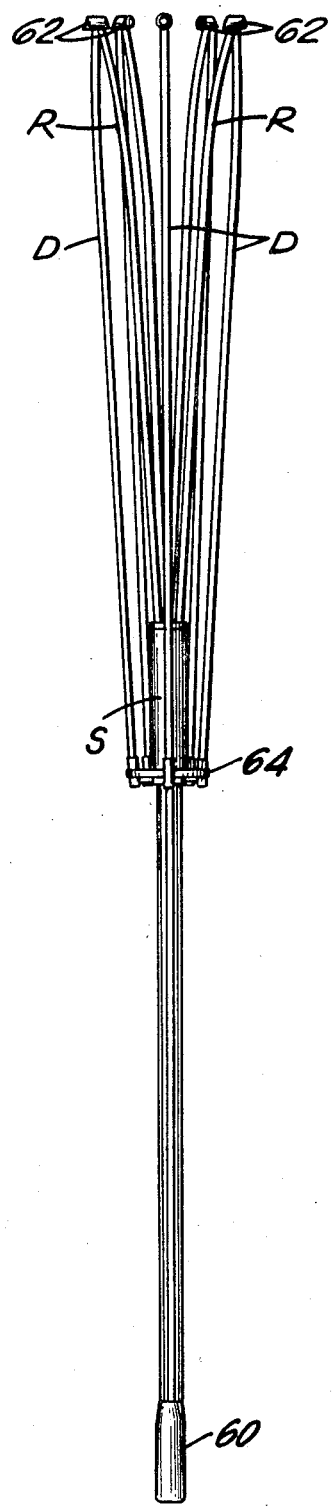
Figure 9:
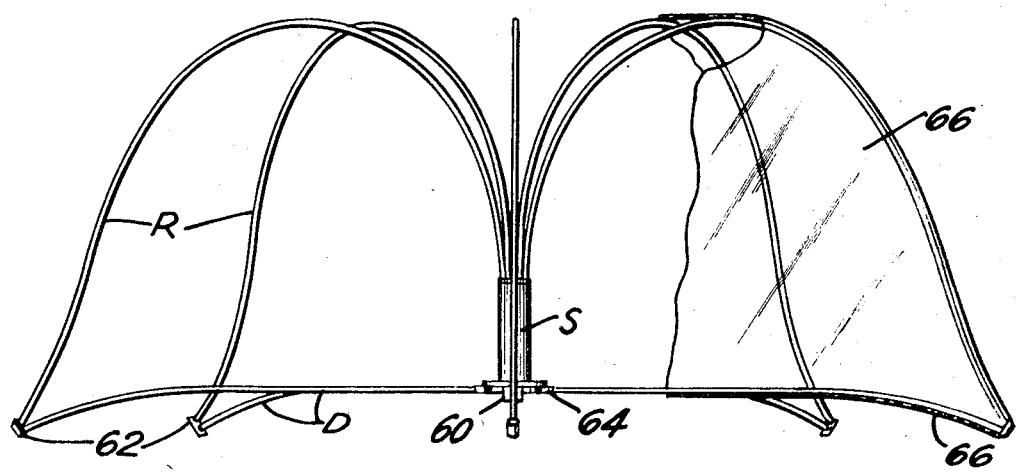
Figure 9A:
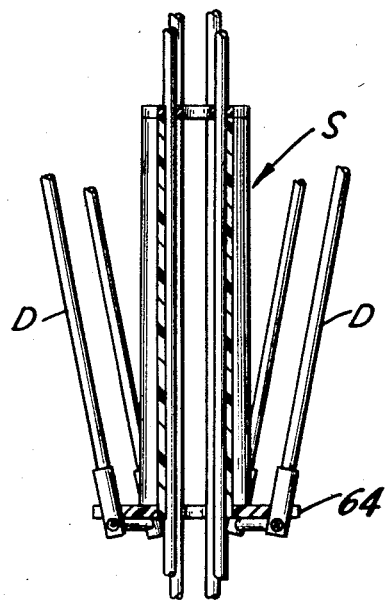
Figure 10:
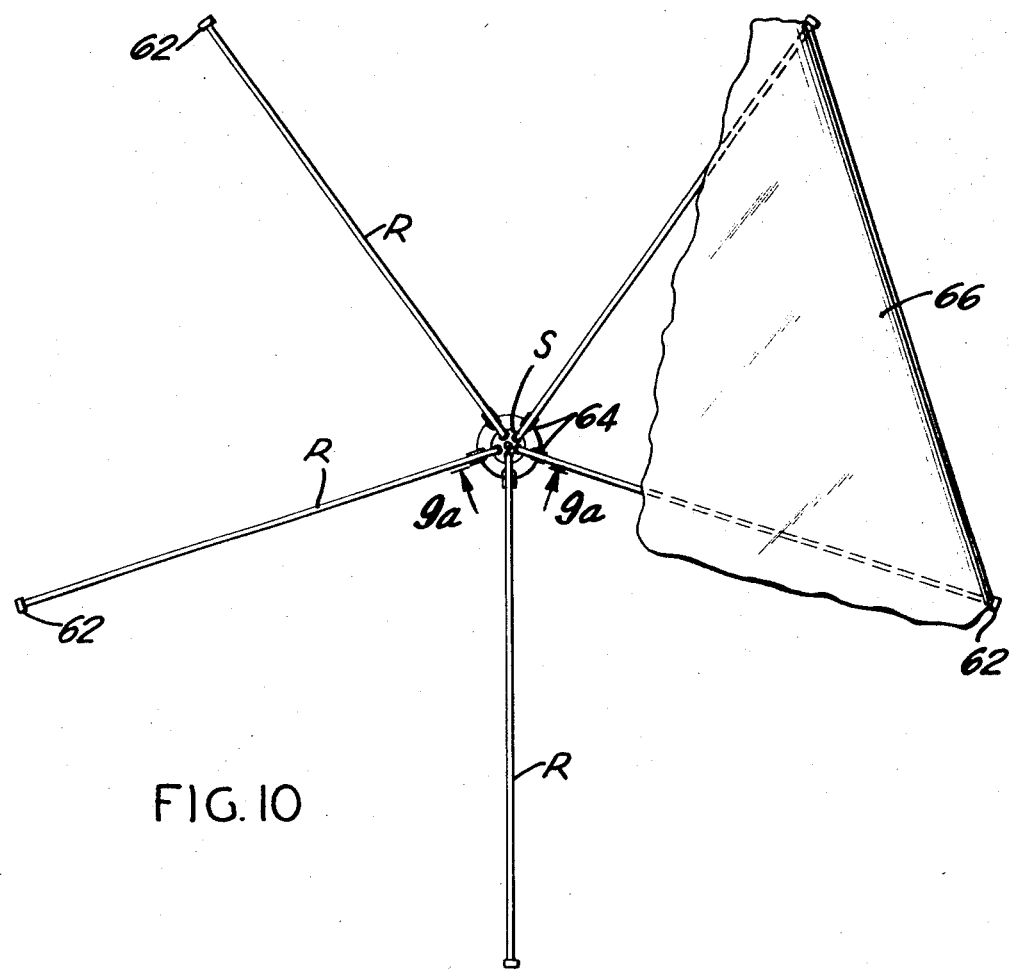
Figure 10A:
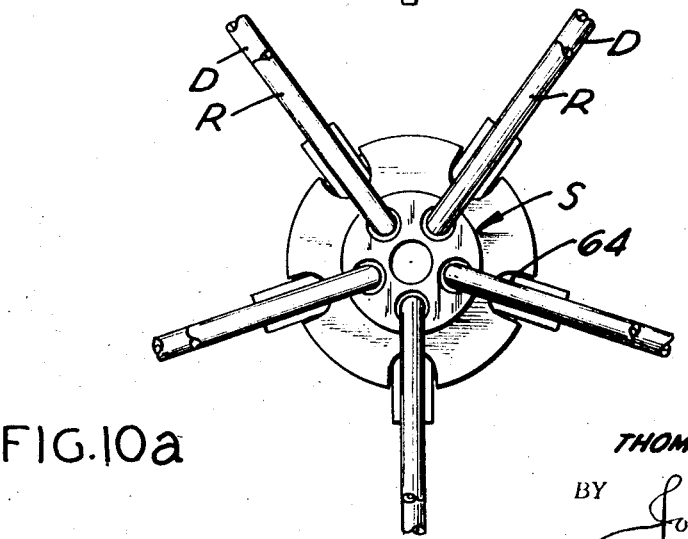

Referring now to FIGS. 8-10, there is shown in schematic form the structure of the invention useful as a collapsible tent or similar structure for camping and military purposes as well as a landing device dropped from an airborne vehicle whereby the structure is automatically expanded from a compacted to assembled form on impact.

A plurality of members R and D are rod-shape, the members R being substantially flexible and the members D being substantially rigid. A common slider S is of general cylindrical form embracing and receiving therein the plurality of members. One end of the plurality of members R is commonly connected as at 60. The opposite ends of the members R are respectively connected with a hinge as at 62 to a generally rigid director member D. The opposite end of each of the members D is connected with a hinge to the slider S as a 64. A flexible or expansible sheet is attached to the members to serve as a skin. As shown in FIG. 8 the assembly is in the contracted or compact form. As the slider moves downwardly, as shown in FIGS. 7 and 8, the respective directors D force the upper end of the respective members R to deform in an arcuate bow-shape, expanding progressively as the slider is moved downwardly. In the fully expanded position, the slider S is at ground level and the respective ends of the member 62 are on the ground and the guide members D are then perpendicular to the members R. The surface or skin 66 in fully expanded or tensioned position, serves as a structural support of the tent.

It will be appreciated by those skilled in the art that the device shown in FIG. 8 may be guided towards the surface of the earth or a spatial body from an airborne vehicle by appropriate guide means, well known in the art. When the lower portion 60 strikes the ground, the reactive force of impact will cause the slider S to be forced downwardly thereby expanding the assembly automatically from that shown in FIG. 8 to that shown in FIGS. 9 and 10. The director D may also be provided with a skin surface as a floor whereby the full expanded assembly may be hermetically sealed. As such the system may be provided with suitable air conditioning or air supplying equipment, whereby an enclosure for human beings is provided protected from an otherwise deleterious environment.

It will be further appreciated that such devices would be useful for landing on oceans or surfaces of very low density, such as dust ash and the like. The expanded surfaces formed by directors D will act as a large area and thus of low unit loading, suitable to prevent sinking into the surface of dust or the like.

It will be further appreciated that because of the flexible form of the ends 62 of the director and reactor, when expanded, the central portion of the device is not only self-stabilizing but will assume a substantially vertical position even if the device lands on slopes or over brush or tree area, as the "legs" formed by the director-reactor combination will settle or rise with respect to the other legs depending on the terrain. Furthermore, if the ends portions are provided with pontoons or floats, the system is readily adapted for landing and remaining afloat on water.

Figure 11:
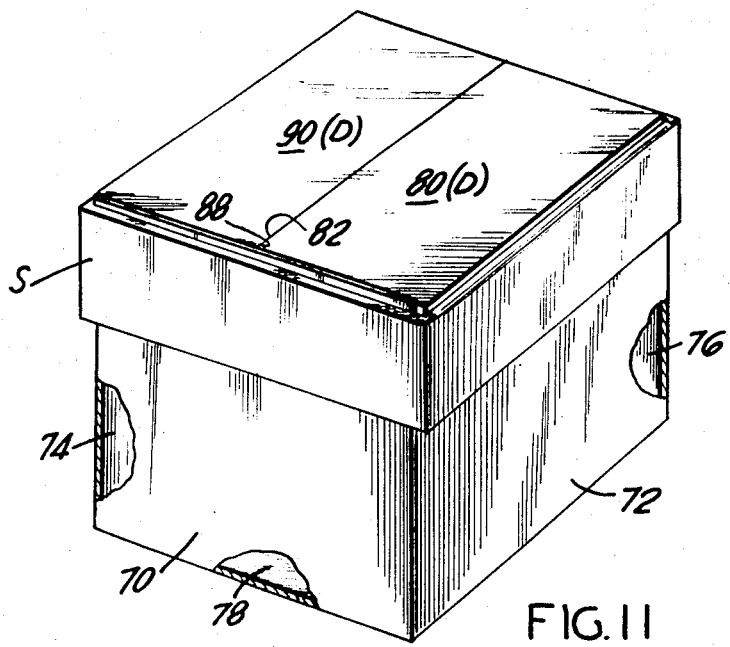
Figure 12:
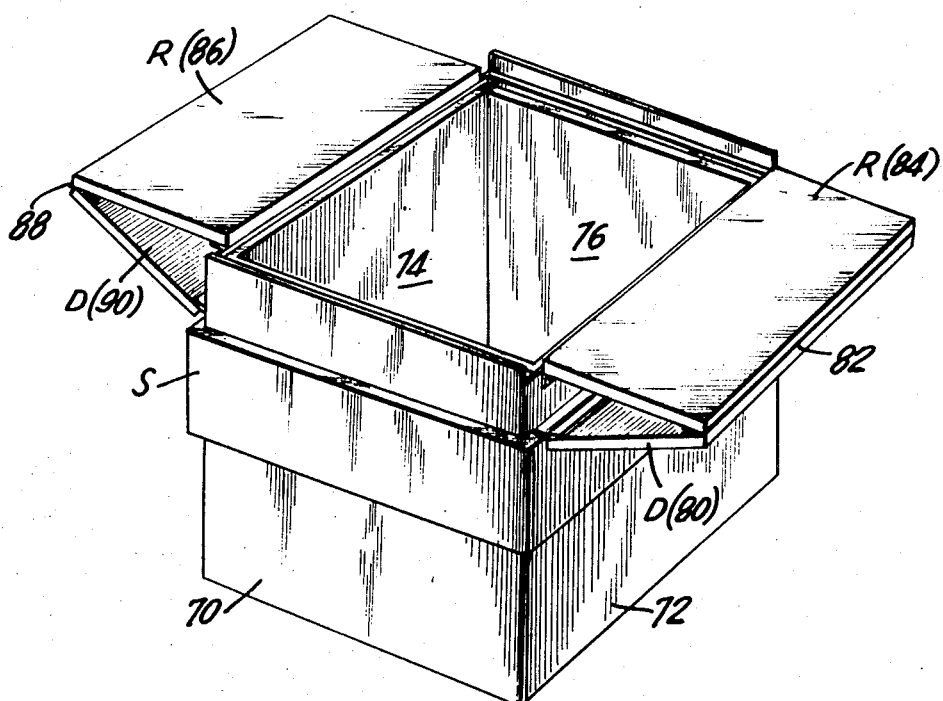

Referring now to FIGS. 11 and 12, there is shown a still further form of the invention showing for the first time an application of the invention wherein all of the members are substantially rigid, that is, non-flexible, and the mode of operation of the structure is effected by having the members articulated, as will be better understood from a study of the illustrated embodiment.

A box is formed of four walls 70, 72, 74 and 76, and a bottom wall 78. At the upper edge of wall 72, is pivotally connected a director member 80 which in turn is articulated at the end portion 82 to a reactor member R designated 84. The opposite end of member 84 is pivotally connected to the top edge of slider S which is formed to encircle the outer faces of the box. The wall 74 is provided at its upper end, similarly, with a reactor member 86 articulated at 88 by forming a pivotal connection to reactor member 90. The slider S is connected to the opposite edge of the director 90. In operation, the slider S in being moved downwardly causes the directors to draw the reactor members upwardly to transform the cover as shown.

Referring now to FIGS. 14 and 15, there is shown another application of the invention for use in containers for cigarettes, cereals and the like, provided with a unique form of cover having articulated, as distinguished from flexible members formed from the tool of the invention.

As seen in FIGS. 14 and 15, the container has a front wall 100, a rear wall 102, side walls 106 and 106 and bottom wall 108. The upper end of walls 102 and 100 are extended respectively into a cover portion 110 and 112 and articulated by a flexible hinge to a second cover portion 114, 116, respectively. Another portion of each is effected by articulation to form portions 118 and 120 respectively. The other ends of panels 118 and 120 are pivotally connected to portions 122 and 124 respectively. The opposite ends of panels 124 and 122, are tabs to form the slider S of the carton.

A unitary blank or templet of foldable materials to form the box is shown in FIG. 13, the several portions of the carton labeled to correspond to the box shown in FIG. 14, noting that dotted-line numbers are on the reverse side as seen in the drawing. Panels indicated with shading represent the portions that are glued to the opposite panels to fabricate the carton.

In operation as slider S comprising walls 122, 124, 126 and 128 is slid downwardly as shown in FIG. 15, director portions 118 and 120 withdraw respectively the articulated panels 114 and 110 comprising one reactor member of the invention and articulated panels 112 and 116, comprising the other articulated reactor member of the invention. The range of movement of the slider S depends, it should be clear, upon the length of the director 118 and reactor portions 114 and 110.

It will be seen that I have provided a significant novel structural system that is transformable from a relatively linear and side-by-side arrangement to an expanded non-linear or curvilinear arrangement contemplating a wide variety of embodiments. Accordingly, it will be understood that certain features and combinations of my invention are of utility even though I have not made specific or explicit reference to them. It should be further understood that various changes may be made in details of the embodiments illustrated within the scope of my claims without departing from the spirit of my invention. It is, therefore, to be clearly understood that my invention is not to be limited to the specific details shown and described.

What I claim is:

1. A structure comprising, in combination:
   (a) at least one first member being generally elongated and distortable along its major axis;
   (b) at least one second member attached to said first member;
   (c) a linking member attached to said second member and adapted for slidable engagement with said first member;
   (d) said first and second members being so constructed that said members are transformed from a relatively side-by-side position to a diverted position by relative movement of said linking member in a direction away from the attachment of said first and second members.

2. A structure according to claim 1 wherein a pair of said first and second members are of planar form, said first members being flexible, and said secondary members being substantially rigid.

3. A structure according to claim 1, wherein
   (a) a pair of said first and second members are formed of springy material;
   (b) a rigid rod is attached to the free end of each of said first members;
   (c) said linking member is a collar slidable on said rod; and
   (d) said collar is attached to the free end of each of said second members.

4. A structure according to claim 1 in combination with a container having
   (a) a top, bottom, rear and two side walls;
   (b) a first member being formed of flexible material to serve as the front wall of said container, and being attached to said container at said bottom wall;
   (c) said linking member being formed as a collar girdling said front, rear and side walls, and arranged for slidable engagement in vertical movement between the top and bottom walls;
   (d) said second member being a substantially rigid planar member attached along one edge thereof to said first member and attached along the opposite edge thereof to said collar;
   (e) whereby said first member is transformed from a closure of said container as said collar is in an extreme upward position to provide an access opening to said container as said collar is moved downward to cause said first member to be drawn from said container.

5. A structure according to claim 1, wherein
   (a) said first member is formed of flexible material in planar form;
   (b) said second member is formed of relatively rigid material in planar form, and
   (c) said flexible material is provided with a coating of light-producing material.

6. A structure according to claim 5 wherein said coating is responsive to varying electrical signals to effect light intensities as a function of said signals, and said structure further comprises electrical means responsive to the movement of said linking member for producing varying electrical signals as a function of said movements and means connecting said electrical means to said coating of light-producing material.

7. A structure according to claim 1
   (a) having a plurality of said first and second members;
   (b) said first members being formed of flexible material in rod-like form;
   (c) said second members being formed of relatively rigid material in rod-like form;
   (d) the free ends of said first members being connected together;
   (e) said linking member encircling all of said first members and connected respectively to said second members; and
   (f) flexible material attached to said members to form a skin over said structure when said members are in diverted position.

8. A structure according to claim 1, wherein
   (a) said first member is an elongated sheet of spring material;
   (b) said second member is an elongated sheet of relatively rigid material;
   (c) a rigid rod is attached to the free end of said first member, and
   (d) said linking member is a collar slidably receiving said rod and pivotally attached to the free end of said second member.

References Cited

UNITED STATES PATENTS 1,285,082  11/1918  Emshwiller _____ 135—20
3,067,925  12/1962  Gillam.

REINALDO P. MACHADO, Primary Examiner

U.S. Cl. X.R.

135—20; 229—44